Patented July 7, 1931

1,813,619

UNITED STATES PATENT OFFICE

JOSEF HALLER, OF WIESDORF, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

CYANOGEN HALIDE DERIVATIVES OF CELLULOSE AND PROCESS OF MAKING

No Drawing. Application filed August 11, 1928, Serial No. 299,116, and in Germany August 17, 1927.

The present invention relates to new cellulose derivatives derived from cyanogen halides and to a process of preparing same.

In accordance with the invention new cellulose derivatives containing nitrogen are obtainable by reacting upon alkali-cellulose with a cyanogen halide such as cyanogen chloride or bromide suitably in the presence of an organic solvent which is indifferent to cyanogen halides, such as carbon tetrachloride, ethylether, etc. The use of these solvents is not necessary, it being possible to produce the new cellulose derivatives by leading a cyanogen halide in the vapor phase over alkali cellulose. The reaction begins at very low temperatures, for instance, at about $-10°$ C., which temperatures quickly rise by self-heating.

As soon as no further reaction takes place (which will be the case in a rather short time, for instance, within about half an hour) the reaction mass is pressed off, rinsed, acidified, rinsed again, and dried. The products thus obtainable behave very similarly to cellulose, but in contradistinction to the latter show a nitrogen content, the percentage of which is mainly dependent upon the quantity of cyanogen halide used, and have the property of being directly colored by acid wool dyestuffs in strong shades.

The following examples illustrate my invention without limiting it thereto:—

*Example 1.*—20 parts by weight of cotton are treated at ordinary temperature with a mixture of 60 parts by volume of caustic soda (33%), 60 parts by volume of alcohol and 30 parts by volume of water for about ½ hour. The alkali cellulose thus obtained is then pressed off and caused to be reacted upon by a solution of 6 parts by weight of cyanogen bromide in 20 parts by volume of carbon tetrachloride. Reaction takes place with self-heating and after about ½ hour the reaction product may be pressed off, rinsed, acidified, rinsed again and dried. The product thus obtainable appears to be very similar to cotton but shows a nitrogen content of about 1.9%.

*Example 2.*—10 parts by weight of cotton are treated with caustic soda as described in Example 1, pressed off and stirred while cooling to about $-10°$ C. into 150 parts by volume of ethylether in which 2% of cyanogen chloride have been dissolved. As soon as no further reaction takes place the reaction product is washed, soaped, washed again and dried. It shows a nitrogen content of about 1.7%.

I claim:—

1. Process which comprises reacting upon alkali cellulose with a cyanogen halide.

2. New cellulose derivatives obtainable by reacting upon alkali cellulose with a cyanogen halide, said derivatives containing nitrogen and being capable of being directly colored by acid wool dyestuffs in strong shades.

3. The process which comprises reacting upon alkali cellulose with cyanogen bromide in the presence of carbon-tetra-chloride.

In testimony whereof I have hereunto set my hand.

JOSEF HALLER. [L. S.]